US011027702B2

(12) United States Patent
Buß

(10) Patent No.: US 11,027,702 B2
(45) Date of Patent: Jun. 8, 2021

(54) WIPER ARM DEVICE FOR MOTOR VEHICLES

(71) Applicant: Valeo Wischersysteme GmbH, Bietigheim-Bissingen (DE)

(72) Inventor: Michael Buß, Bietigheim-Bissingen (DE)

(73) Assignee: Valeo Wischersysteme GmbH, Bietigheim-Bissingen (DE)

( * ) Notice: Subject to any disclaimer, the term of this patent is extended or adjusted under 35 U.S.C. 154(b) by 373 days.

(21) Appl. No.: 16/107,173

(22) Filed: Aug. 21, 2018

(65) Prior Publication Data
US 2019/0061699 A1 Feb. 28, 2019

(30) Foreign Application Priority Data

Aug. 23, 2017 (DE) ...................... 10 2017 119 223.9

(51) Int. Cl.
*B60S 1/34* (2006.01)
*B60S 1/48* (2006.01)

(52) U.S. Cl.
CPC ........... *B60S 1/3415* (2013.01); *B60S 1/3409* (2013.01); *B60S 1/48* (2013.01)

(58) Field of Classification Search
CPC .... B60S 1/34; B60S 1/48; B60S 1/522; B60S 1/524; B60S 1/3415; B60S 1/3409; B60S 1/3402; B60S 1/365
USPC ............. 15/250.04, 250.21, 250.34, 250.351
See application file for complete search history.

(56) References Cited

U.S. PATENT DOCUMENTS

| 3,008,170 | A | * | 11/1961 | Marks | ........................ | B05B 1/10 |
| | | | | | | 15/250.04 |
| 5,283,926 | A | * | 2/1994 | Hoshino | ................ | B60S 1/3415 |
| | | | | | | 15/250.34 |
| 2002/0170135 | A1 | * | 11/2002 | Zimmer | ................ | B60S 1/3409 |
| | | | | | | 15/250.21 |
| 2004/0216261 | A1 | * | 11/2004 | Ritt | ........................ | B60S 1/3409 |
| | | | | | | 15/250.351 |
| 2013/0152322 | A1 | | 6/2013 | Jarasson | | |

FOREIGN PATENT DOCUMENTS

| CN | 201304969 Y | | 9/2009 |
| DE | 102015223501 A1 | | 6/2017 |
| FR | 2993525 | * | 1/2014 |
| FR | 3050706 A1 | | 11/2017 |

OTHER PUBLICATIONS

Machine language translation of description portion of French publication 3050706, published Nov. 2017. (Year: 2017).*
Machine translation of description portion of German publication 102015223501, published Jun. 2017. (Year: 2017).*
Search Report issued in corresponding German Patent Application No. 10 2017 119 223.9, dated Jun. 13, 2018 (10 pages).

* cited by examiner

*Primary Examiner* — Gary K. Graham
(74) *Attorney, Agent, or Firm* — Osha Bergman Watanabe & Burton LLP

(57) ABSTRACT

The invention relates to a wiper arm apparatus (10) for motor vehicles, having a wiper arm head (12), which comprises a drive lever (18), which can be connected to a drive shaft (20), whereby an intermediate lever (22) pivotally supported on the drive lever (18) cooperates with a control lever (24), which control lever (24) is arranged pivotably about a shaft (26) on the side facing away from the intermediate lever (22), and with a fastening device (30; 30*a*) for (Continued)

at least one hose (1, 2) for supplying a cleaning fluid to a wiper arm (14).

12 Claims, 2 Drawing Sheets

WIPER ARM DEVICE FOR MOTOR VEHICLES

PRIOR ART

The invention relates to a wiper arm apparatus for motor vehicles.

A wiper arm apparatus for motor vehicles is known from the applicant's US 2013/152322 A1. The known wiper arm apparatus is distinguished by a fastening device for at least one hose for supplying a cleaning fluid to a wiper arm, said fastening device being designed in the form of a spiral spring, wherein the fastening device radially surrounds the hose in a partial region of the length thereof in which said hose is guided in a curved manner. Furthermore, the two spring ends of the fastening device or of the spiral spring are in each case arranged in a fixed position, wherein the one spring end engages in a hole in a control lever of the wiper arm head. It is essential here that the spring end of the fastening device is fastened to the control lever at a distance from a longitudinal axis of a shaft, to which the control lever is pivotably fastened. Furthermore, the hose is arranged at a distance from the longitudinal axis of the shaft, and therefore, due to the fact that the hose is not guided in the region of the longitudinal axis of the shaft, a relatively powerful movement of the hose occurs. The hose may possibly also be in contact with a fastening element for the control lever in the region of the shaft, said contact being able to cause mechanical stressing of the hose or even preliminary damage.

DISCLOSURE OF THE INVENTION

The wiper arm apparatus according to the invention for motor vehicles has the advantage that it permits a defined guidance of the hose in the region of the mounting of the control lever, wherein the guidance in a precisely defined manner means that the hose is deformed or moved relatively little, and wherein contact, in particular with the shaft for the control lever, in the region of which the hose is guided, is reliably avoided. As a result, the wiper arm apparatus according to the invention makes it possible for damage to or severe mechanical loads on the hose to be able to be reliably prevented.

According to the invention, for this purpose the wiper arm apparatus provides that the fastening device is arranged in at least partial overlap with the shaft about which the control lever is arranged pivotably, and in that the control lever is arranged pivotably about the longitudinal axis of the shaft together with the fastening device. A fastening of the fastening device to the control lever for rotation therewith is therefore proposed, in which the hose is guided or curved in a specific manner in the region of the longitudinal axis during pivoting of the control lever.

Advantageous developments of the wiper arm apparatus according to the invention for motor vehicles are cited in the dependent claims. All combinations of at least two features disclosed in the claims, the description and/or the figures fall within the scope of the invention.

In order to minimize the mechanical stressing of the hose during the pivoting of the fastening device about the longitudinal axis of the shaft, it is provided that the control lever is arranged pivotably about the longitudinal axis of the shaft by a pivoting angle of no more than 40°, preferably 30° maximum. Such small pivoting angles of the control lever are achieved, in particular in the case of a wiper arm apparatus for vehicles, when said wiper arm apparatus is arranged in the region of the front passenger's side or for cleaning the field of view of the vehicle windscreen in the region of the front passenger's side.

In a structurally preferred refinement of the fastening device, the latter comprises a support plate, from which two guide walls arranged at an angle relative to one another protrude, wherein the at least one hose is arranged in a receiving region limited by the guide walls and the support plate. The hose is therefore guided between the two guide walls, on the one hand, and by the support plate arranged between the shaft and the hose, on the other hand.

In a structural development of the proposal put forward last, it is provided that the angle between the two guide walls of the fastening device corresponds to the pivot angle of the control lever. The at least one hose is therefore arranged loosely between the guide walls during pivoting of the control lever and typically only touches the guide walls when the control lever has taken up its end position during pivoting. In particular, the mechanical stressing of the guide walls or of the fastening device is thereby also minimized.

A further minimization of the mechanical stressing of the at least one hose guided by the fastening device is achieved if the at least one hose is arranged movably on the support plate in a longitudinal direction and a transverse direction.

Tolerance compensation or a movement of the at least one hose during the pivoting movement of the wiper arm head is thereby possible, and installation-induced component tolerances are compensated for.

In order to avoid that the at least one hose can escape out of the at least one fastening device, or is guided securely within the receiving region of the fastening device, it is furthermore provided that the guide walls each have a hold-down section arranged approximately parallel to the support plate on the side facing away from the support plate which at least temporarily engages beyond the at least one hose when moving the control lever.

In order to permit simple installation of the at least one hose in the receiving region of the fastening device, in particular if the latter is already connected to the shaft about which the control lever is pivotably arranged, it is provided that an insertion region for the at least one hose is formed between the two guide walls of the fastening device, into which the at least one hose can be inserted into the receiving area in a direction running perpendicular to the plane of the support plate.

Furthermore, an optimized guidance of the hose on the mounting of the control lever on the side facing away from the shaft makes provision for the support plate to extend over a partial region of the axial extent of the control lever in the direction towards an intermediate lever.

A fastening device described to this extent with the various sections or elements can be produced particularly simply and cost-effectively if it is formed as an injection-moulded plastic part.

A further minimization of the mechanical loading of the hose during the pivoting of the control lever is achieved if the at least one hose, starting from the fastening device in the direction towards the intermediate lever, is arranged in the shape of a bow.

In order always to permit simple installation or removal of the fastening device on or from the control lever, it is provided that the fastening device is advantageously connected to the control lever by means of a latch connection.

In particular, it can be provided, in a structurally preferred refinement of the fastening device, that a preferably annular receiving portion protrudes from the support plate in the direction to the control lever, said portion having a receptacle, concentric relative to the longitudinal axis of the shaft, for a fastening element of the control lever, and in that two latching hooks protrude from the support plate in the direction to the control lever, which engage behind the control lever to establish a latch connection.

In order to form the fastening of the fastening element to the control lever for rotation therewith, it is provided, in a development of the proposal put forward last, that the latching hooks are arranged in the area and in abutment to straight lateral walls of the control lever, i.e. outside the immediate area on the shaft.

Further advantages, features and details of the invention emerge from the description below of preferred exemplary embodiments and with reference to the drawing, in which.

Identical elements or elements with the same function are provided with the same reference numbers in the figures.

Figure 1:
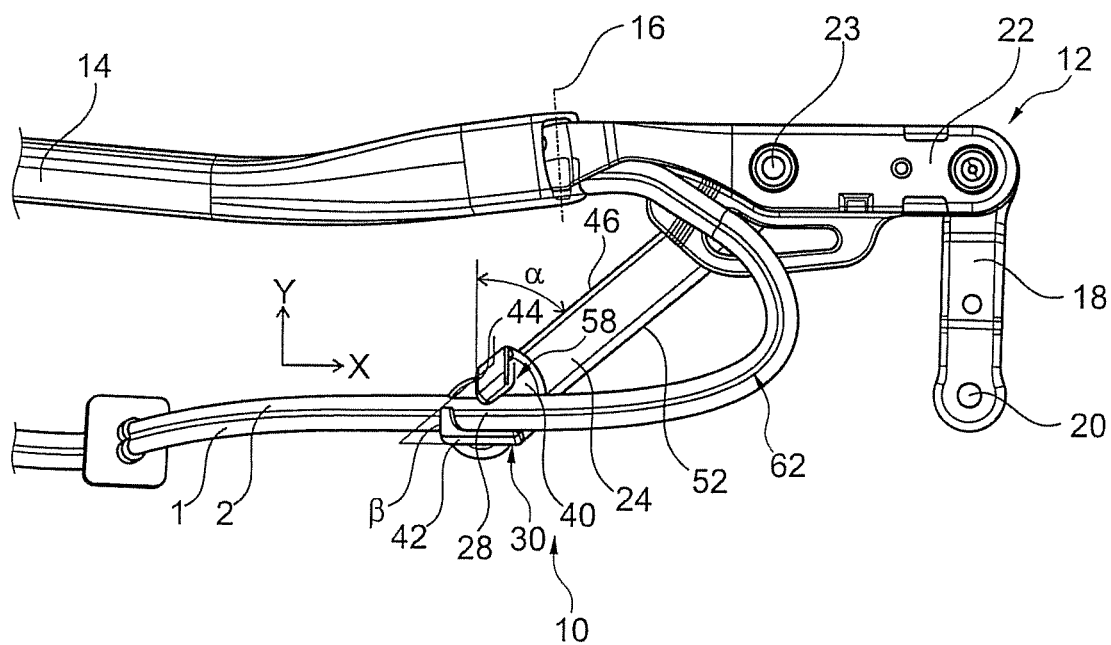
FIG. 1 shows a wiper arm apparatus for motor vehicles in a top view.
Figure 2:
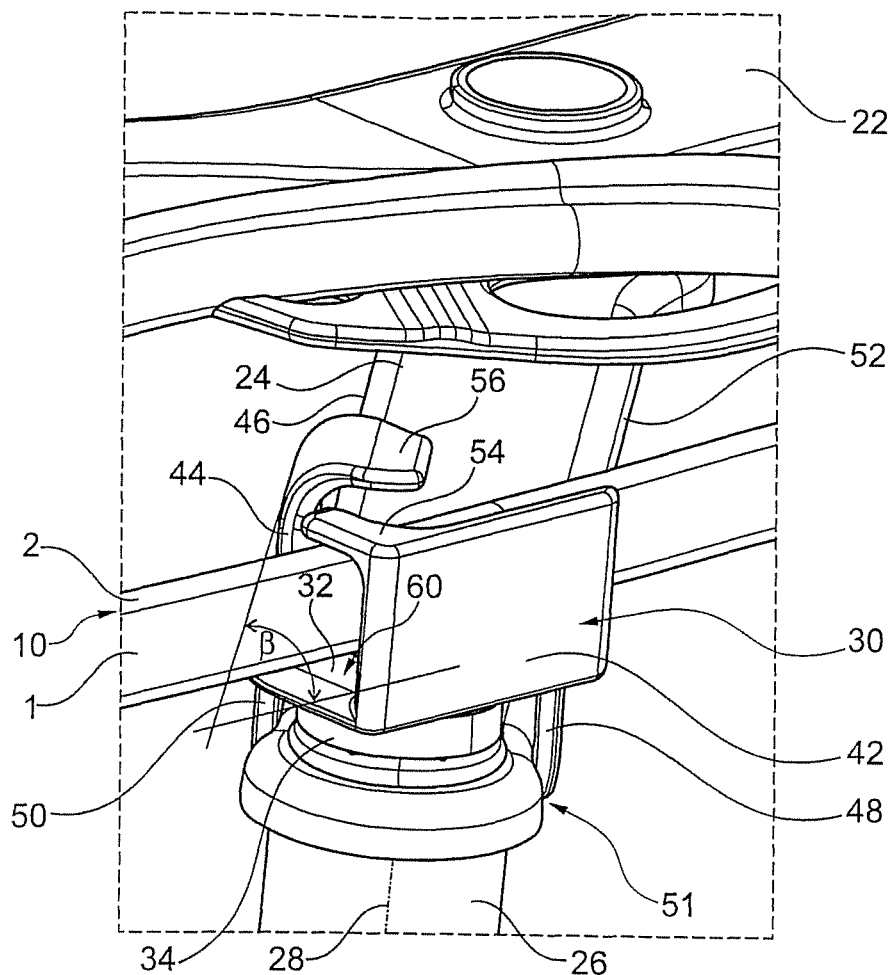
FIG. 2 shows a detail from the wiper arm apparatus of FIG. 1 in a perspective illustration.

FIGS. 1 and 2 illustrate a wiper arm apparatus 10 for motor vehicles. The wiper arm apparatus 10 is used in particular in utility vehicles or buses and furthermore is preferably used in the region of the front passenger's side of the motor vehicle.

The wiper arm apparatus 10 has a wiper arm head 12, which is connected to a wiper arm 14, wherein the wiper arm 14 is mounted on the wiper arm head 12 so as to be pivotable about a pivot axis 16. A wiper blade (not shown and not essential to the invention) is at least indirectly connected to the wiper arm 14.

The wiper arm head 12 comprises a drive lever 18, which is connected in an end region to a drive shaft 20 for rotation therewith. The drive shaft 20 is at least indirectly connected to a wiper motor. On the side facing away from the drive shaft 20, the drive lever 18 is connected in an articulated manner to an intermediate lever 22. The intermediate lever 22 is coupled to the wiper arm 14 via the pivot axis 16 on the side facing away from the drive lever 18. In a central region with respect to the axial extent of the intermediate lever 22, the intermediate lever 22 is connected in an articulated manner at an axis 23 to a control lever 24, the end of which that faces away from the intermediate lever 22 is mounted in a shaft 26 (FIG. 2). The control lever 24 is arranged pivotably about the longitudinal axis 28 of the shaft 26 by a pivoting angle α of no more than 40°, preferably 30° maximum.

For supplying cleaning fluid to the wiper blade (not shown) of the wiper arm apparatus 10, use is made of two hoses 1, 2 which, in the exemplary embodiment illustrated, are connected at least in regions to each other, for example over their axial extent, or are produced as a unit by extrusion. The two hoses 1, 2 are inserted into the cross section of the wiper arm 14 in the connecting region between the intermediate lever 22 and the wiper arm 14, and are hydraulically connected to in each case one longitudinal side of the wiper blade or spray devices arranged there in such a manner that, depending on the pivoting direction of the wiper arm 14 or of the wiper blade, cleaning fluid can in each case be applied to the vehicle windshield as needed directly in front of the wiper blade. Such a need- or direction-controlled supplying of cleaning fluid to a wiper blade of a wiper arm apparatus 10 is known per se from the prior art and therefore is not explained in more detail below.

The two hoses 1, 2 are coupled or connected to the wiper arm apparatus 10 by means of a fastening device 30. The fastening device 30 is formed in particular as an injection-moulded plastic part and is arranged aligned at least in regions with the longitudinal axis 28 of the shaft 26. As can be seen in particular with reference to FIG. 2, the fastening device 30 comprises a support plate 32, on which a receiving portion 34 of annular design is integrally formed on the side facing the control lever 24. The receiving portion 34 has a receptacle (not shown) which is in the manner of a blind hole and surrounds or overlaps a fastening element connecting the control lever 24 to the shaft 26. The fastening element (likewise not illustrated) is designed here in particular in the form of a threaded nut.

As can be seen in particular with reference to FIG. 1, the support plate 32 has a partial portion 40 which extends from the shaft 26 along the control lever 24 over a partial region of the axial length of the control lever 24. From the support plate 32, two guide walls 42, 44 which enclose an angle β extend in a direction running perpendicularly to the plane of the support plate 32, wherein the angle β corresponds to the pivoting angle α of the control lever 24 about the longitudinal axis 28 of the shaft 26. While the one guide wall 42 is located directly next to the longitudinal axis 28, the other guide wall 44 extends parallel to the one lateral wall 46 of the control lever 24 at a distance from the longitudinal axis 28. Two latching hooks 48, 50 are integrally formed on the support plate 32 on the side facing the control lever 24 and engage behind the control lever 24 and thereby fix the fastening device 30 to the control lever 24 in a direction running perpendicularly to the plane of the control lever 24 by means of a latching connection 51.

Since, furthermore, the two latching hooks 48, 50 are located in the region of the two lateral walls 46, 52 of the control lever 24, i.e. in a region spaced apart from the longitudinal axis 28, the fastening device 30 is pivoted or moved by the control lever 24 during pivoting by the control lever 24 about the longitudinal axis 28, and therefore the fastening device 30 is connected to the control lever 24 for rotation therewith.

On the side facing away from the support plate 32, respective hold-down sections 54, 56 extend from the two guide walls 42, 44 parallel to the support plate 32 in the direction of the longitudinal axis 28. The two hold-down sections 54, 56 at least temporarily engage beyond at least one of the two hoses 1, 2 during pivoting of the control lever 24. The two hold-down sections 54, 56 are arranged offset with respect to each other and not in overlap with each other, and therefore an insertion region 58 is formed between the two hold-down portions 54, 56, the manner of opening or size of which is such that the hoses 1, 2 can be inserted between the guide walls 42, 44 in a direction running parallel to the longitudinal axis 28 of the shaft 26.

The two hoses 1, 2 are arranged within the fastening device 30 in a receiving region 60, wherein the receiving region 60 is bounded on the one hand by the support plate 32 and on the other hand by the two guide walls 42, 44 and, on the side facing away from the support plate 32, by the two hold-down sections 54, 56. Within the receiving region 60, the two hoses 1, 2 are arranged movably above the plane of the support plate 32, i.e. in the X and Y direction.

The two hoses 1, 2, which are connected to a storage container (not shown) for the cleaning fluid, are arranged between the fastening device 30 and the region leading into the wiper arm 14 in the shape of a bow 62 which at least approximately comprises an angle of 180°.

Figure 3:
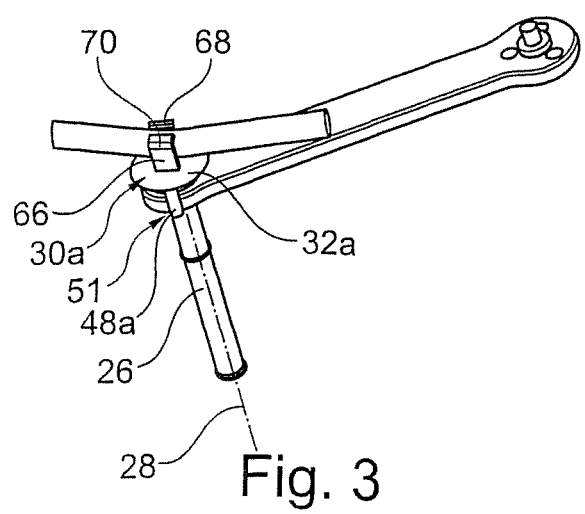
FIG. 3 shows a control lever with a fastening device arranged thereon in a wiper arm apparatus that is modified in relation to FIGS. 1 and 2, in a perspective illustration.

The fastening device 30a illustrated in FIG. 3 differs from the fastening device 30 in that the support plate 32a is of circular design. On both sides of the longitudinal axis 28 of the shaft 26, two holding portions 66, 68 for a hose 1 extend at an identical distance, said holding portions each having, on the side facing away from the support plate 32a, a holding portion 70 directed in a hook-shaped manner in the direction of the hose 1. The hose 1 can be inserted between said holding portions 66, 68, for example by elastic deformation thereof. The support plate 32a is arranged concentrically with respect to the longitudinal axis 28 of the shaft 26 and overlaps the corresponding region of the control lever 24. The two latching hooks 48a extend on that side of the circular support plate 32a which faces the control lever 24 and likewise engage behind the control lever 24 to establish the latch connection 51.

The wiper arm apparatus 10 described to this extent and the fastening device 30, 30a for at least one hose 1, 2 can be modified in diverse ways without departing from the inventive concept.

LIST OF REFERENCE SIGNS 1, 2 Hose
10 Wiper arm apparatus
12 Wiper arm head
14 Wiper arm
16 Pivot axis
18 Drive lever
20 Drive shaft
22 Intermediate lever
23 Axis
24 Control lever
26 Shaft
28 Longitudinal axis
30, 30a Fastening device
32, 32a Support plate
34 Receiving portion
40 Partial portion
42, 44 Guide wall
46 Side wall
48, 48a Latching hook
50 Latching hook
51 Latching connection
52 Side wall
54, 56 Hold-down section
58 Insertion region
60 Receiving region
62 Bow
66, 68 Holding section
70 Holding section

The invention claimed is:

1. A wiper arm apparatus for motor vehicles, comprising: a wiper arm head which comprises a drive lever, wherein the drive lever is connected to a drive shaft, whereby an intermediate lever pivotally supported on the drive lever cooperates with a control lever, wherein the control lever is arranged pivotably about a second shaft which the control lever pivots on a side facing away from the intermediate lever; and a fastening device for at least one hose for supplying a cleaning fluid to a wiper arm, wherein the fastening device is arranged in at least partial overlap with a longitudinal axis of the second shaft and arranged pivotably about the longitudinal axis together with the control lever, wherein the fastening device comprises a support plate, from which two guide walls arranged at an angle relative to one another protrude, wherein the at least one hose is arranged in a receiving area limited by the guide walls and the support plate, and wherein the angle between the guide walls corresponds to a pivot angle of the control lever.

2. The wiper arm apparatus according to claim 1, wherein the control lever is arranged pivotably about the longitudinal axis of the second shaft by a pivoting angle of no more than 40°.

3. The wiper arm apparatus according to claim 1, wherein the guide walls protrude perpendicularly from the support plate.

4. The wiper arm apparatus according to claim 1, wherein the at least one hose is movably arranged on the support plate in a longitudinal direction and a transverse direction.

5. The wiper arm apparatus according to claim 1, wherein the guide walls each have a hold-down section arranged approximately parallel on the side facing away from the support plate which at least temporarily engages beyond the at least one hose when moving the control lever.

6. The wiper arm apparatus according to claim 1, wherein an insertion region for the at least one hose is formed between the two guide walls, into which the at least one hose can be inserted into the receiving area in a direction running perpendicular to the plane of the support plate.

7. The wiper arm apparatus according to claim 1, wherein the support plate extends with a section along an axial extension of the control lever in the direction toward the intermediate lever.

8. The wiper arm apparatus according to claim 1, wherein the fastening device is formed as an injection-molded plastic part.

9. The wiper arm apparatus according to claim 1, wherein the at least one hose, starting from the fastening device in the direction towards the wiper arm, is arranged in the shape of a bow.

10. The wiper arm apparatus according to claim 1, wherein the fastening device is connected to the control lever by a latch connection.

11. The wiper arm apparatus according to claim 1, wherein an annular receiving portion protrudes from the support plate in the direction to the control lever, said portion having a receptacle, concentric relative to the longitudinal axis of the second shaft, for a fastening element of the control lever, and wherein two latching hooks protrude from the support plate in the direction to the control lever, which engage behind the control lever to establish a latch connection.

12. The wiper arm apparatus according to claim 11, wherein the latching hooks are arranged in the area and in abutment to straight lateral walls of the control lever.

* * * * *